(12) United States Patent
Ji et al.

(10) Patent No.: US 9,409,113 B2
(45) Date of Patent: Aug. 9, 2016

(54) SELF-OSCILLATING NOZZLE AND PULSE-JET CLEANING SYSTEM WITH THE SAME

(71) Applicant: China University of Petroleum-Beijing (CUPB), Beijing (CN)

(72) Inventors: Zhongli Ji, Beijing (CN); Xiaolin Wu, Beijing (CN); Honghai Chen, Beijing (CN); Liang Yang, Beijing (CN); Zhiyi Xiong, Beijing (CN)

(73) Assignee: China University of Petroleum—Beijing, Beijing (CN)

( * ) Notice: Subject to any disclaimer, the term of this patent is extended or adjusted under 35 U.S.C. 154(b) by 48 days.

(21) Appl. No.: 14/397,788

(22) PCT Filed: Jan. 18, 2013

(86) PCT No.: PCT/CN2013/070714
§ 371 (c)(1),
(2) Date: Mar. 4, 2015

(87) PCT Pub. No.: WO2014/079160
PCT Pub. Date: May 30, 2014

(65) Prior Publication Data
US 2015/0165360 A1 Jun. 18, 2015

(30) Foreign Application Priority Data
Nov. 22, 2012 (CN) .......................... 2012 1 0479270

(51) Int. Cl.
*B01D 46/00* (2006.01)
*B01D 46/24* (2006.01)
(Continued)

(52) U.S. Cl.
CPC .......... *B01D 46/0068* (2013.01); *B01D 46/002* (2013.01); *B01D 46/0002* (2013.01);
(Continued)

(58) Field of Classification Search
CPC ........... B01D 46/0068; B01D 46/2407; B01D 46/0002; B01D 46/0019; B01D 46/002; B05B 1/265; B05B 1/005; B05B 1/34; B05B 1/00
USPC ..................... 55/282–305; 239/222.11, 589.1
See application file for complete search history.

(56) References Cited

U.S. PATENT DOCUMENTS 3,509,698 A * 5/1970 Medcalf ............. B01D 46/0068
55/302
4,398,931 A * 8/1983 Shevlin ................ B01D 39/086
210/497.1
(Continued)

FOREIGN PATENT DOCUMENTS

CN 201791124 U 4/2011
CN 102728161 A 10/2012
CN 202983430 U 6/2013

OTHER PUBLICATIONS

International Search Report dated Sep. 5, 2013 from PCT/CN2013/070714, 8 pages.
Search Report dated Oct. 16, 2013 from CN Application No. 201210479270.6, 2 pages.
Supplemental Search Report dated Jun. 14, 2014 from CN Application No. 201210479270.6, 2 pages.
Chinese First Office Action dated Oct. 16, 2013, from corresponding Chinese Patent Application No. 2012104792706, 11 pages.
Chinese Second Office Action dated Jun. 14, 2014 from corresponding Chinese Patent Application No. 2012104792706, 6 pages.

*Primary Examiner* — Thomas Bennett McKenzie
(74) *Attorney, Agent, or Firm* — Ohlandt, Greeley, Ruggiero & Perle, LLP

(57) ABSTRACT

The present invention relates to a pulse-jet cleaning device for filter with a self-oscillating nozzle, in which a tube sheet of the filter is provided with a filtration unit thereon, with a cleaning gas chamber above the tube sheet and a dust-containing gas chamber under the tube sheet; and the pulse-jet cleaning device includes an ejector and a back-flushing pipeline, with one end of the back-flushing pipeline connected to a back-flushing gas tank through a pulse back-flushing valve, the other end of the back-flushing pipeline being provided with a self-oscillating nozzle corresponding to the top portion of the ejector; and the self-oscillating nozzle includes a hollow cylindrical self-oscillating chamber, which has a gas inlet at an upper end connected to the back-flushing pipeline and a gas outlet at a lower end.

5 Claims, 7 Drawing Sheets

(51) Int. Cl.
*B05B 1/00* (2006.01)
*B05B 1/34* (2006.01)
*B05B 1/08* (2006.01)
*B05B 1/26* (2006.01)

(52) U.S. Cl.
CPC ........ *B01D46/0019* (2013.01); *B01D 46/2407* (2013.01); *B05B 1/005* (2013.01); *B05B 1/083* (2013.01); *B05B 1/34* (2013.01); *B05B 1/265* (2013.01)

(56) References Cited

U.S. PATENT DOCUMENTS

| | | | |
|---|---|---|---|
| 5,333,787 A | 8/1994 | Smith et al. | |
| 6,022,388 A * | 2/2000 | Andersson | B01D 46/0068 55/302 |
| 6,360,965 B1 * | 3/2002 | Clearman | B05B 3/008 239/214 |
| 2013/0220125 A1 * | 8/2013 | Heidenreich | B01D 46/0068 95/280 |

* cited by examiner

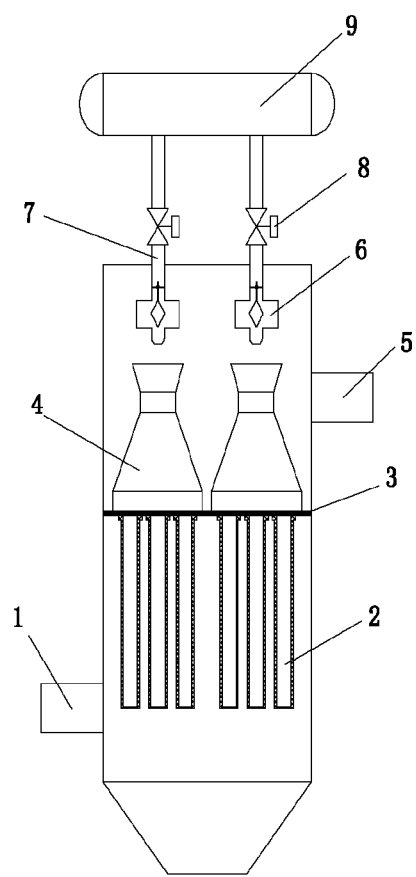
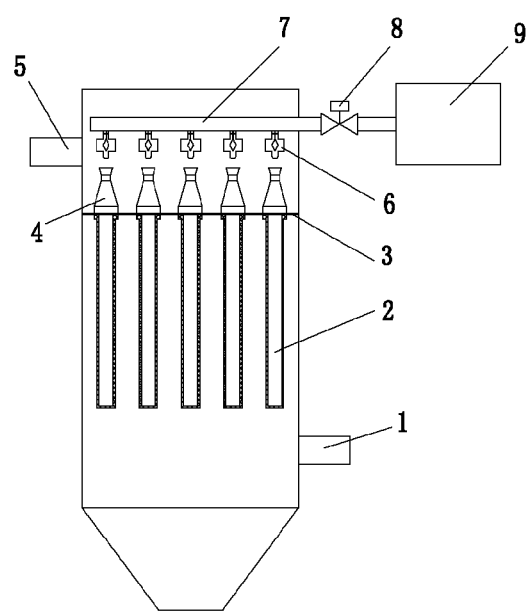
Fig. 4
Fig. 5

Fi. 6B

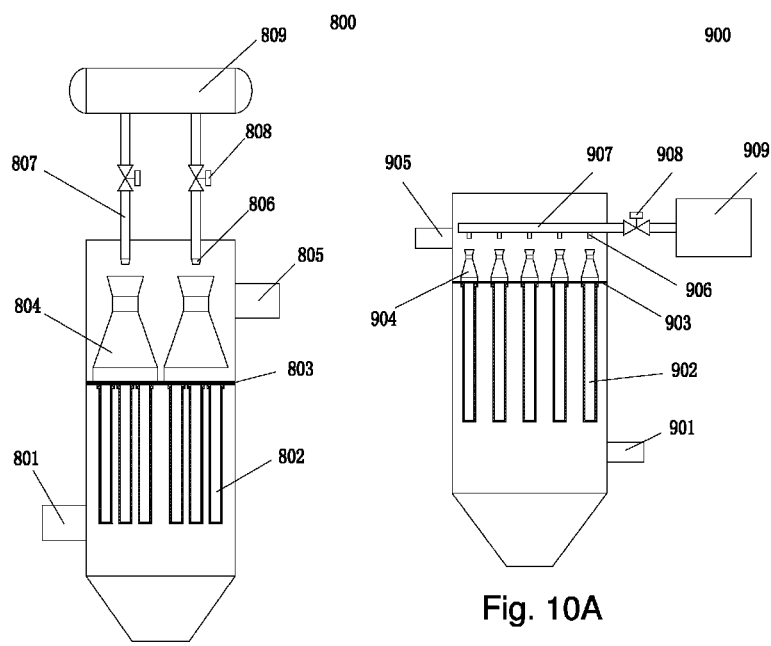
Fig. 9A
Fig. 10A
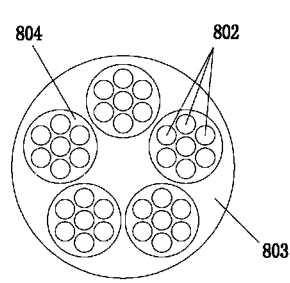
Fig. 9B
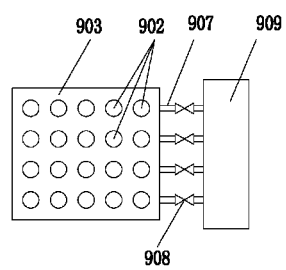
Fig. 10B

SELF-OSCILLATING NOZZLE AND PULSE-JET CLEANING SYSTEM WITH THE SAME

TECHNICAL FIELD

The present invention relates to a device of separating gas and solid, involving in a pulse-jet cleaning device for filter, especially involving in a self-oscillating nozzle and a pulse-jet cleaning device for filter with a self-oscillating nozzle.

BACKGROUND ART

In the chemical, petroleum, metallurgical or electrical industries, etc., the high temperature dust-containing gas is normally produced, and has to be deashed since it is necessary for different processes to recycle the energy and meet the emission standards for environment preservation. Deashing the high-temperature gas is a technique to accomplish the gas purification through directly separating the gas and solid, which can increase the rate of energy utilization by utilizing the physical sensible heat, chemical latent heat and kinetic force of the gas to the greatest extent, as well as can simplify the processing and save the equipment investment.

The rigid high-temperature filtration elements such as the sintered metal filtration pipeline and ceramic filter tube, etc. possess good performances in anti-seismic, the high-temperature resistance, the corrosion resistance and thermal impact, as well as comparatively high filtration accuracy and efficiency. Therefore, they are broadly applied in the field of purifying the high-temperature gas.

When the high-temperature dust-containing gas enters into the filter, the dust particles in the airflow are intercepted and form a filtration cake layer on the outside surface of the filtration element, and the gas passes through the porous passages of the filtration element for the followed-up processes. The filtered gas becomes clean and contains dust with very low density. With the continuous filtering, the dust cake layer on the outside surface of the filtration element gradually becomes thick, which results an increase in the pressure drop of the filtration element and requires the application of back-flushing to reactivate the performance and function of the filtration elements. With the direction opposite to the filtration flow, the high-temperature back-flushing airflow enters into the inner side of the filtration element instantaneously to generate the momentary energy to peel off the dust cake layer attached on the outside surface of the filtration element, with the pressure drop of the filtration element restoring to the pressure for the primary filtration, and therefore the performance and function of the filtration element is reactivated.

The pulse-jet cleaning method is an important method for realizing the recycle and reactivation of the performance and function of the filtration element. The deashing performance of a pulse jet cleaning device decides whether the high-temperature gas filter can stably operate in a long term or not.

The high-temperature gas filter mainly has two kinds of structures, a circular structure and a square structure (depending on the shapes of the tube sheets). FIGS. 9A and 9B schematically show the structure of a high-temperature filter 800 with the circular structure, which is mainly used in the operating conditions with high temperature and high pressure (the parameters for the typical working situation: the operating pressure is about 4-6 MPa and the operating temperature is about 350-450° C.). FIGS. 10A and 10B schematically show a structure of a high-temperature filter 900 with the square structure, which is mainly used in the operating conditions with high temperature and low pressure (the parameters of the typical working situation: the operating pressure is about 0.2-0.4 MPa, and the operating temperature is about 550-650° C.). The two high-temperature filters in different structures have the same operating principles.

As shown in FIGS. 9A, 9B, 10A and 10B, the tube sheet 803 and 903 of the filter 800 and 900 divide the filter into two portions with the lower portion called the dust-containing gas side and the upper portion called the cleaning gas side. The dust-containing gas (or coarse mixed gas) enters into the dust-containing gas side of the filter through the gas inlets 801 and 901 of the filters 800 and 900, and arrives at each filtration unit by the impetus of the gas, the dust particles in the gas being intercepted and forming the dust cake layer on the outside surface of the filtration pipeline 802 and 902, and the gas entering into the cleaning gas side after being filtered through the porous passages of the filtration pipeline 802 and 902, and being discharged through the gas outlet 805 and 905 for the followed-up processes. With the continuous filtering, the dust cake layer on the outside surface of the filtration pipeline 802 and 902 gradually becomes thick, which results an increase in the pressure drop of the filter 800 and 900 and requires the application of back-flushing to reactivate the performance and function of the filtration elements. During the pulse-jet cleaning, with the normally closed pulse back-flushing valves 808 and 908 being open, the high pressure nitrogen or clear mixed gas in gas tank 809 and 909 enters into the back-flushing pipeline 807 and 907 instantaneously and ejects the back-flushing gas in the high pressure and high speed to the inside of the corresponding ejectors 804 and 904 through the nozzle 806 and 906 on the tube, and then the back-flushing gas enters into the inner side of the corresponding filtration pipelines 802 and 902 to generate the momentary energy to peel off the dust cake on the outside surface of the filtration pipelines 802 and 902 and make the resistance of the filtration pipeline basically restore to the initial level, so as to realize the reactivation of the performance and function of the filtration pipeline.

As shown in FIGS. 9A and 9B, in the case that the filter 800 has the filtration pipelines arranged in a circular shape, each filtration unit is provided with a plurality of (normally 48) filtration pipelines therein and all filtration units share one ejector 804, wherein in the circular filtration unit, the filtration pipelines 802 are arranged in the congruent triangle shape, 12 or 24 filtration units normally are provided on the tube sheet 803 of the filter. When performing the back-flushing, based on the previously set back-flushing time, the first group of the filtration units is back flushed, and after a period of time, the second group of filtration units is back flushed, and then after another period of time, the third group of filtration units is back flushed. The process is repeated in cycle.

As shown in FIGS. 10A and 10B, in the case that the filter 900 has the filtration pipelines arranged in a square shape, the filtration pipelines 902 are arranged on the tube sheet 903 with the equal distance among the rows and lines, and divided into several groups in the unit of lines, normally several or more than 10 filtration pipelines 902 being provided in each line with the filtration pipelines 902 in each line corresponding to one ejecting and flushing tube 907, several nozzles 906 being provided on each ejecting and flushing tube 907, and a filtration pipeline 902 being provided right under each nozzle 906. The back-flushing is performed group by group in the unit of lines, namely, the pulse back-flushing valve 908 for the first line of filtration pipelines opens and the corresponding ejecting and flushing tube 907 back flushes the line of filtration elements, after a period of time, the pulse back-flushing valve 908 for the second line of filtration pipelines opens and the corresponding ejecting and flushing tube 907 back flushes the second line of filtration elements, and then after another period of time, the pulse back-flushing valve 908 for the third line of filtration pipelines opens and the third line of filtration elements are back flushed. The process is repeated in cycle.

To sum up, the pulse back-flushing of the high-temperature gas filter in the prior art achieves the deashing effect mainly through the momentary energy by causing a high-pressure back flushed gas to generate a pressure wave in the filtration pipeline. In the prior art, the nozzle of the pulse back-flushing device is in a normal single hole structure (single tube) and provided on the back-flushing pipeline, which causes the pressure wave to be generated in the filtration pipeline only one time when the back flushed gas is ejected through the nozzle in such structure. Normally, the higher the pressure of the back-flushing is, the higher the peak value of the generated pressure is and the better the deashing effect is. But in the practical operation, the back-flushing in the prior art will unavoidably cause the following problems.

(1) Over High Pressure of the Pulse-Jet Cleaning

Due to that the back-flushing gas needs to overcome the operating pressure of the filter and the flowing resistance of the filtered gas flow, the energy of the back-flushing gas cannot be completely applied on the filtration unit. Therefore, the deashing pressure over 2 times than the filter operating pressure in the practical operation is needed, and the back-flushing pressure under the high-temperature and high-pressure working situation will reach at 8 PMa, which causes a great impact on the filter tubes and easily causes the filtration pipeline vibrate. The higher pressure is, and the more seriously the filtration pipeline vibrates. Such high pressure deashing operation can easily cause breakage and even fracture of the filtration pipeline due to the thermal impact fatigue.

(2) Non-Uniformity of Pulse-Jet Cleaning Effects

During the pulse-jet cleaning, the back flushed flow will continuously leak from the gaps among the porous passages when the momentary energy generated by the back flushed flow enters into the filtration pipeline and is transmitted from the opening end of the filtration pipeline to the sealed end, which causes the continuous dissipation of the energy during the transmission and great difference of the deashing effects from the lower portion of the filtration pipeline to the upper portion of the filtration pipeline, with the dust cake attached on the surface of the lower portion of the filtration pipeline being uneasily cleaned by the back flushed flow and thereby occurring the incomplete deashing phenomenon, which causes the bridging of the dust cakes among the filtration pipeline and the malfunction of filtration pipeline as a consequence.

(3) Low Efficiency of Pulse Jet Cleaning

As stated above, the back-flushing techniques in the prior art evaluate the deashing effect mainly by the pressure peak of the back-flushing, wherein the pressure peak value refers to the biggest pressure generated by the ejected deashing flow from the back-flushing device in the filtration pipeline at the moment of pulse ejecting. However, the high pressure peak value may not achieve the ideal deashing effect, mainly because each time that the back-flushing by the pulse-jet cleaning device (i.e. the pulse back-flushing valve opens one time), the pressure wave can only be generated in the filtration pipeline one time. As the deashing effect on the upper position of the filtration pipeline is greatly different from that on the lower position and the energy of the generated pressure wave decreases quickly, the efficiency of pulse-jet cleaning in the actual operation of the high-temperature filter is relatively low, which cannot achieve the ideal deashing effect.

It seems that the regeneration efficiency can also be improved if the pulse back-flushing solenoid valve is opened and closed more times during the deashing, in the case that the pulse-jet cleaning device in the prior art is used, each time the pulse back-flushing solenoid valve being opened, the filtration pipeline being deashed one time. However, such operation is inapplicable for the following reasons: first, the pulse back-flushing solenoid valve is expensive with the membrane of the solenoid valve having a limited service life, and the repetitive activation of the solenoid valve will also reduce the service life; second, the filtered dust-containing gases under the high-temperature operating situation mainly contain the corrosive, inflammable and explosive gas, which requires the purified intert gas (such as nitrogen) as the deashing gas resource for deashing. However, the cost of the intert gases is high, and repetitive activation of the solenoid valve will also increase the consumption of the back-flushing gas; third, due to the relatively high back-flushing pressure required by the pulse back-flushing, a big thermal impact on the filtration pipeline is generated when the back-flushing flow enters into the filtration pipelines. It is certain that the repetitive activation of the pulse back-flushing solenoid valve will destroy the filter tube and shorten the service life of the tubes; four, an important principle of pulse jet cleaning is that the deashing can only be performed when the dust cake on the outside surface of the filtration pipeline becomes thick to a certain extent. Otherwise, the weak interacting force among the dust cakes due to the thinness of the dust cake, results in that the deashing energy is ineffective and thereby the thin dust cake cannot be peeled off. Therefore, although the back-flushing effect does not reach the requirement, the solenoid valve cannot be activated to deash, and only when the dust cake on the surface of the filtration pipelines is accumulated in a certain thickness, can the back-flushing be executed again.

Therefore, the inventor himself proposes a self-oscillating nozzle and a pulse-jet cleaning device with the self-oscillating nozzle to overcome such technical defects, based on years of experience and practice in working in the related industry.

SUMMARY OF THE INVENTION

The object of the present invention is to provide a self-oscillating nozzle and a pulse-jet cleaning device with a self-oscillating nozzle. When the pulse back-flushing valve is activated to perform the pulse back-flushing, the back-flushing flow is generated in the filtration pipelines and the multiple pressure oscillatory waves are transmitted, so as to improve the non-uniformity of the back-flushing and improve the regeneration efficiency.

The other object of the present invention is to provide a self-oscillating nozzle and a pulse-jet cleaning device with the self-oscillating nozzle, which can also reduce the consumption of the back-flushing flow and simultaneously reduce the thermal impact on the filtration pipeline, thereby prolonging the service life of the filtration pipeline.

The object of the present invention is realized by a pulse jet cleaning device for filter with a self-oscillating nozzle, wherein a tube sheet of the filter is provided with a filtration unit which consists of at least one filtration element, the tube sheet hermetically divides the filter into a cleaning gas chamber in an upper portion and a dust-containing gas chamber in a lower portion, and the pulse-jet cleaning device comprises an ejector provided on an upper portion of the filtration unit and a back-flushing pipeline corresponding to the ejector, with one end of the back-flushing pipeline connected to a back-flushing gas tank through a pulse back-flushing valve, wherein the other end of the back-flushing pipeline is provided with a self-oscillating nozzle corresponding to a top portion of the ejector, and the self-oscillating nozzle comprises a hollow cylindrical self-oscillating chamber, which has a gas inlet at an upper end connected to the back-flushing pipeline and a gas outlet at a lower end, wherein an oscillating frequency regulating part, with a shuttle shape of two pointed ends and a wide middle portion, and with a smooth external transition surface, is suspended in the axial direction in the self-oscillating chamber corresponding to the gas inlet and gas outlet.

In a preferable embodiment of the present invention, the gas inlet and gas outlet are provided in the central axial direction of the self-oscillating chamber and formed as the circular pipelines with a diameter less than that of the self-oscillating chamber, with the inner diameter of the gas outlet being gradually tapered, and the oscillating frequency regulating part is suspended at the center of the circular pipeline of the gas inlet with a position regulating lever being connected to an upper end of the oscillating frequency regulating part in the axial direction.

In a preferable embodiment of the present invention, a suspension bracket is provided inside the circular pipeline of the gas inlet, and the upper portion of the position regulating lever is fixed at the center of the suspension bracket.

In a preferable embodiment of the present invention, the self-oscillating chamber is connected to circular pipeline of the gas inlet and/or the circular pipeline of the gas outlet through a connection part in a shape of a truncated cone, and a convex or concave setting is formed by the connection part in the shape of a truncated cone and the upper and lower ends of the self-oscillating chamber.

In a preferable embodiment of the present invention, the tube sheet of the filter is provided with a plurality of groups of filtration units, each group of filtration units is provided with a plurality of filtration elements, wherein the self-oscillating nozzle is provided above the ejector of each group of filtration units respectively.

In a preferable embodiment of the present invention, the filtration element is a sintered metal filtration pipeline or a ceramic filter tube.

The purpose of the present invention can also be realized by a self-oscillating nozzle, which is characterized by comprising a hollow cylindrical self-oscillating chamber having one gas inlet on the upper end thereof and one gas outlet on the lower end thereof, and an oscillating frequency regulating part with a smooth external transition surface in a shuttle shape with two pointed ends and a wide middle portion, the oscillating frequency regulating part being suspended in the axial direction in the self-oscillating chamber corresponding to the gas inlet and outlet.

In a preferable embodiment of the present invention, the gas inlet and outlet, being as the circular tubes with the diameter less than that of the self-oscillating chamber with the inner diameter of the gas outlet being gradually tapered, are provided in the central axial direction of the self-oscillating chamber, and the oscillating frequency regulating part is suspended at the center of the circular pipeline of the gas inlet through a position regulating lever connected at the upper end of the oscillating frequency regulating part in the axial direction.

In a preferable embodiment of the present invention, a suspension bracket is provided inside the circular pipeline of the gas inlet, and an upper portion of the position regulating lever is fixed at the center of the suspension bracket.

In a preferable embodiment of the present invention, the self-oscillating chamber is connected to circular pipeline of the gas inlet and/or the circular pipeline of the gas outlet through a connection part in a shape of a truncated cone, and a convex or concave setting is formed by the connection part in the shape of a truncated cone and the upper and lower ends of the self-oscillating chamber.

To sum up, the pulse-jet cleaning device with a self-oscillating nozzle according to the present invention improves the non-uniformity of the back-flushing and increases the regeneration efficiency, when the pulse back-flushing valve is activated and the pulse back-flushing occurs, the back-flushing gas, in an extremely short time for only one pulse back-flushing, generates and transmits a plurality of pressure oscillating waves in the filtration pipeline after passing through self-oscillating nozzle. The pulse jet cleaning device can also reduce the consumption of the back-flushing flow and simultaneously reduce the thermal impact on the filtration pipeline, which thereby prolongs the service life of the filtration pipeline.

DESCRIPTION OF FIGURES

The following figures only intend to make the illustrative explanation and description, and do not limit the scope of the present invention, in which:

FIG. 4 shows the schematic structure of the pulse-jet cleaning device with a circular tube sheet according to the present invention.

FIG. 5 shows the schematic structure of the pulse jet cleaning device with a square tube sheet according to the present invention.

FIGS. 6A~6E show different schematic structures of the self-oscillating nozzle according to the present invention.

FIG. 9A shows the schematic structure of the existing high-temperature filter in a circular shape.

FIG. 9B shows the schematic structure of FIG. 9A from the top view.

FIG. 10A shows the schematic structure of the existing high-temperature filter in a square shape.

FIG. 10B shows the structure of FIG. 10A from the top view.

EMBODIMENTS FOR CARRYING OUT THE INVENTION

For better understanding of the technical features, objects and effect of the present invention, the specific embodiments of the present invention are described as followings by combining with the figures.

Figure 1:
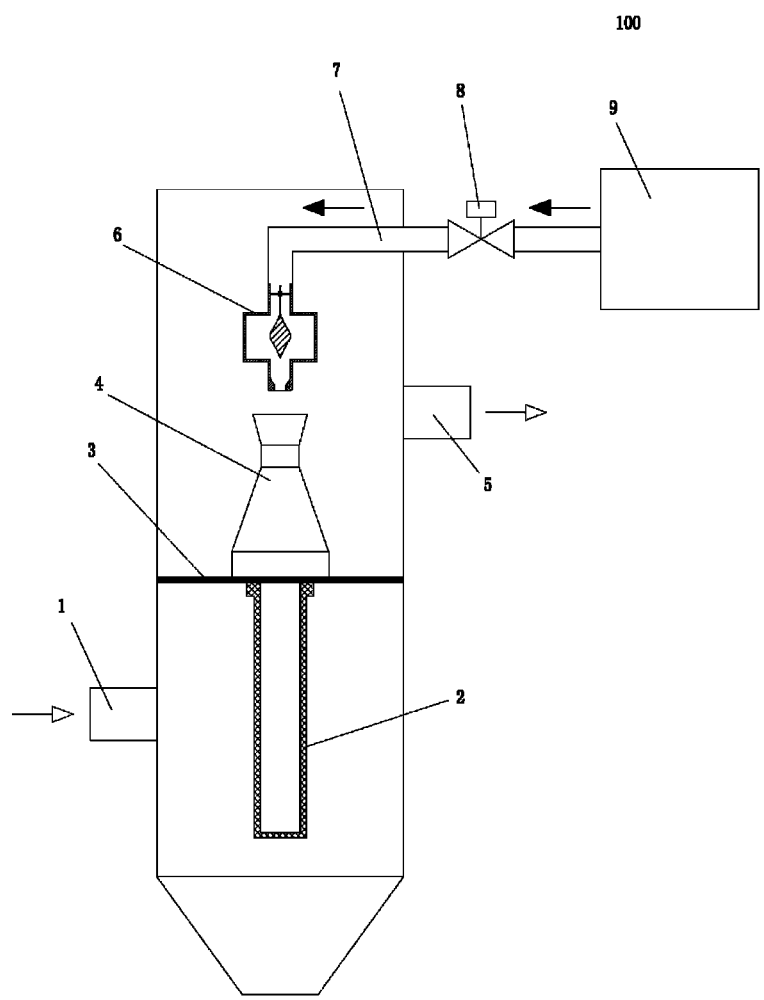
FIG. 1 shows the schematic structure of the pulse jet cleaning device with a self-oscillating nozzle according to the present invention.
Figures 2A, 2B, 2C:
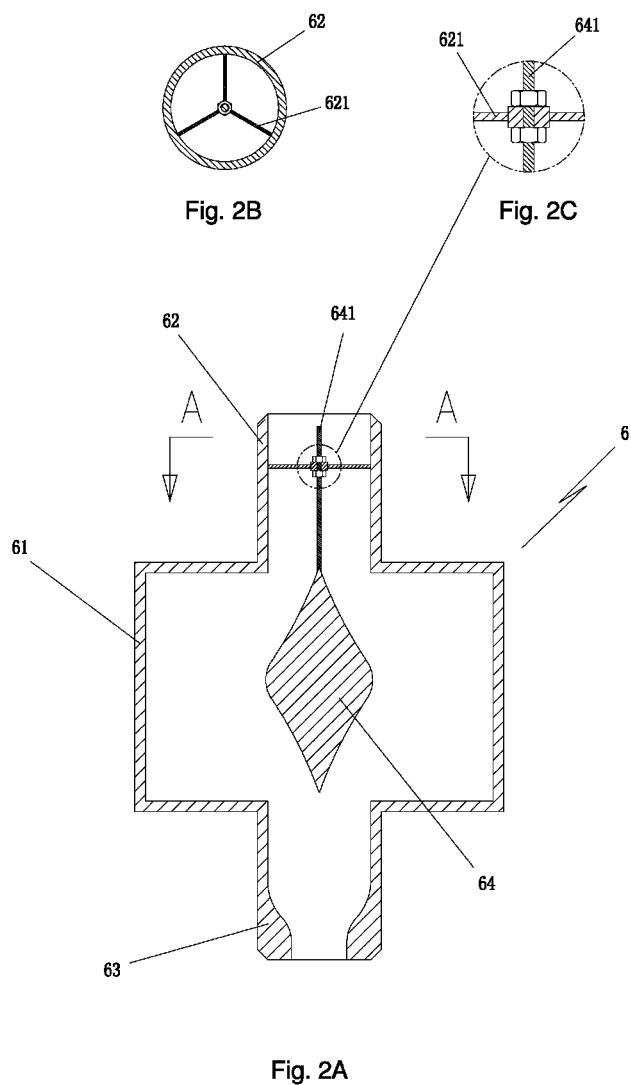
FIG. 2A shows the schematic structure of the self-oscillating nozzle according to the present invention.
FIG. 2B shows the schematic structure sectional view taken along A-A in FIG. 2A.
FIG. 2C shows the schematic partial structure sectional view in FIG. 2A.

As shown in FIG. 1, the present invention provides a pulse jet cleaning device 100 with a self-oscillating nozzle, wherein a filtration unit is provided on a tube sheet 3 of the filter and comprises at least one filtration pipeline 2, and the filtration pipeline in the present invention is the sintered metallic tube or ceramic filter tube; the tube sheet 3 hermetically divides the filter into a cleaning gas chamber on the upper portion thereof and a dust-containing gas chamber on the lower portion thereof; the dust-containing gas passes through the gas inlet 1 of the filter, enters into the dust-containing gas chamber of the filter and arrives at the filtration unit by the driving force of the gas, whereby the dust particles in the gas are intercepted on the outside surface of the filtration pipeline 2, and the gas filtered by passing through the porous passages of the filtration pipeline enters into the clean gas chamber and is handled by the followed-up processes after being discharged through the gas outlet 5; the pulse-jet cleaning clean device 100 comprises an ejector 4 provided on the upper portion of the filtration unit and a back-flushing pipeline 7 corresponding to the ejector 4, with one end of the back-flushing pipeline 7 connected to the back-flushing gas tank 9 by a back-flushing valve 8 and the other end of the back-flushing pipeline 7 provided with a self-oscillating nozzle 6 provided corresponding to the top portion of the ejector 4; as shown in FIGS. 2A, 2B and 2C, the self-oscillating nozzle 6 comprises a hollow cylindrical self-oscillating chamber 61, the self-oscillating chamber 61 having the gas inlet 62 and gas outlet 63 respectively provided on the upper and lower end thereof, with the gas inlet 62 connected to the back-flushing pipeline 7, an oscillating frequency regulating part 64 with a smooth transition outside surface, in a shuttle shape with two pointed ends and wide middle portion being axially suspended in the self-oscillating chamber 61 corresponding to the gas inlet 62 and gas outlet 63.

Figure 3:
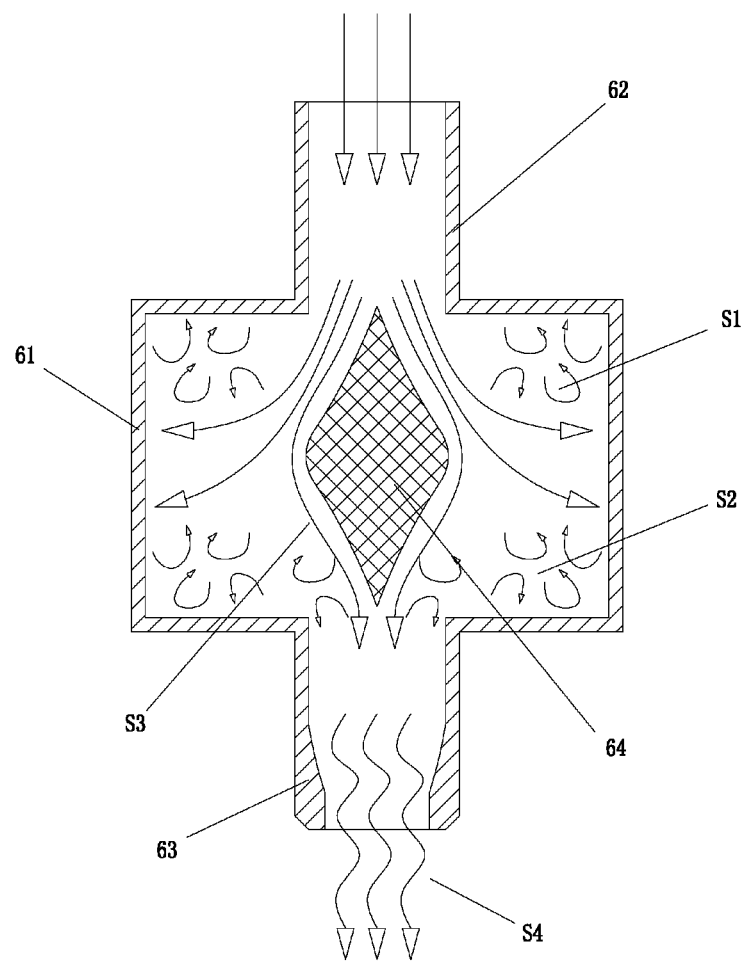
FIG. 3 shows the schematic view of the pressure oscillatory waves generated by the self-oscillating nozzle according to the present invention.

For the pulse-jet cleaning device 100 with a self-oscillating nozzle according to the present invention, during the pulse-jet cleaning, with the back-flushing valve 8 on the back-flushing pipeline 7 being instantaneously activated, a jet flow of gases from the self-oscillating gas tank 9, at a high speed, enters into the self-oscillating chamber 61 with an axis symmetrical structure by passing through the gas inlet 62 of the self-oscillating nozzle 6, wherein the pulse gas at a high speed is turbulently mixed in the self-oscillating chamber 61, which causes the momentum-exchange and thereby generates instable shearing layers, accompanying by a small whirlpool S1 being formed around the shear layers (as shown in FIG. 3) due to the high speed of the jet flow and the instability of the shear layers, and furthermore a big size of whirlpool S2 being formed due to the enlargement of the whirlpool amount in the shear jet flow within a certain frequency extent; when the whirlpool S2 in a big size has a collision with the shuttle regulation part 64 in the self-oscillating chamber 61 of the nozzle, an edge tone is generated, and the disturbing wave of the edge tone makes the instable wave of the shear layers and the feedback disturbing wave to be stimulated and enhanced by each other, which results in the flow of shear layer generates the pressure oscillation in some certain frequency; a part of the gas S3 flows along the surface of the outside wall of the shuttle regulating part 64 (as shown in FIG. 3), due to wall-attachment effect of the flow (wall-attachment effect: when the flow is away from the original flowing direction and intends to flow along the projecting objects, a surface friction exists between the fluid and the object surface on which the fluid flows, in a results that the flowing speed of the fluid slows down; according to the Bernoulli principle of the hydromechanics, if the curvature of the object surface is not just too big, the slowing down of the flowing speed makes the fluid be attached and flow on the object surface. The shuttle regulating part 64 in the present invention will causes the wall-attachment effect on gases); when the frequency of the pressure oscillation matches the inherent frequency of the self-oscillating chamber 61 of the nozzle, the feedback pressure oscillation will be enlarged, and thereby generating a resonance with the gases having the wall-attachment effect in the self-oscillating chamber 61; when the pressure oscillating wave S4 is ejected from the gas outlet 63 and transmitted to the corresponding filtration pipeline 2 through the ejector 4, a plurality of pressure oscillating waves will be generated in the filtration pipeline 2 in a extremely short time (only one time pulse back-flushing), which equals to deash the filtration pipeline 2 in a plurality of times and the regeneration efficiency is improved; meanwhile, the transmission of a plurality of pressure oscillating waves in the filtration pipeline 2 will also improve the non-uniformity of deashing on the upper and lower positions in the filtration pipeline 2 and reduce the possibility of dust bridging between filtration pipelines.

To sum up, the pulse jet cleaning device with a self-oscillating nozzle according to the present invention can improve the non-uniformity of the back-flushing and increase the regeneration efficiency, when the pulse back-flushing valve is activated and the pulse back-flushing occurs, the back-flushing gas, in an extremely short time for only one pulse back-flushing, generates and transmits a plurality of pressure oscillating waves in the filtration pipeline after passing through self-oscillating nozzle.

In the present embodiment, the frequency of the self-oscillating ejecting flow is decided by both of the structure of the self-oscillating nozzle and the characteristics of the ejecting flow itself, and the oscillating frequency has a direct effect on the regeneration efficiency during back-flushing. It is desired that the comparatively strong pressure oscillating waves, with different filtration elements or in various operating situations, can be generated in a greatest possibility during the pulse back-flushing, so as to achieve the better dashing effect. When the stimulating frequency of the pulse back-flushing gas matches the characteristic of the inherent frequency of the self-oscillating nozzle structure, the pressure oscillating of the back-flushing gases becomes stronger and the back-flushing effect is better. Therefore, the self-oscillating nozzle structure shall be designed according to the characteristic of the gas in the gas inlet to make the inherent frequency of the nozzle to approach the frequency of the pulse gas to achieve the good pressure oscillating effect; and the frequency of the back-flushing gas needs to be regulated to make the pulse back-flushing device applicable for different operating situations or different filtration elements, and in order to achieve this purpose, a part (the shuttle oscillating frequency regulating part) being able to change the oscillating frequency is provided in the oscillating chamber of the nozzle. Because the structure of the nozzle is changed by adjusting the upper and lower position of the shuttle oscillating frequency regulating parts, an optimal oscillating frequency can be achieved when the shuttle oscillating frequency regulating part is adjusted to a certain position, and hence the utilization of the pulse back-flushing device of the present invention is more flexible.

In fact, before self-oscillating nozzle is utilized, the position of the shuttle oscillating frequency regulating part in the self-oscillating nozzle has been settled down through adjustment, so there is no way and no need to regulate it during the utilization.

Furthermore, as shown in FIGS. 2A, 2B and 2C, the gas inlet 62 and the gas outlet 63 of the self-oscillating nozzle 6 are provided in the direction of central axis of the self-oscillating chamber 61; both of the gas inlet 62 and gas outlet 63 are the circular tubes with their diameter less than that of the self-oscillating chamber 61; the inside diameter of the gas outlet 63 is gradually tapered, and such shape of flowing passage is used for gathering the oscillating energy; the oscillating frequency regulating part 64 is suspended at the center of the circular pipeline of the gas inlet 62 with its upper end being axially connected to a position regulating lever 641; a suspension bracket 621 is provided inside the circular pipeline of the gas inlet 62 and is composed of three symmetrically arranged brackets, and the upper portion of the position regulating lever is fixed to the central position of the suspension brackets 621 through screws (or other fastening devices). In the embodiment, the oscillating frequency regulating part 64 has the same height as that of the self-oscillating chamber 61 (there is no limitation for the two heights, and it is possible they are different).

Furthermore, in the embodiment, the pulse jet cleaning device is applicable for the filter either with a circular tube sheet or with a square tube sheet. As shown in FIGS. 4 and 5, a plurality of groups of filtration elements are provided on the tube sheet 3 of the filter; each group of filtration units comprise a plurality of filtration pipelines 2, and the top portion of the ejector 41 is respectively and correspondingly provided with a self-oscillating nozzle 6.

Figure 6E:
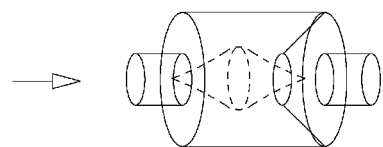
Figure 6D:
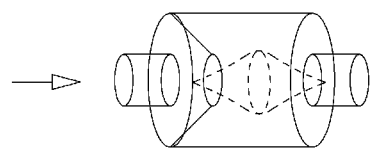
Figure 6C:
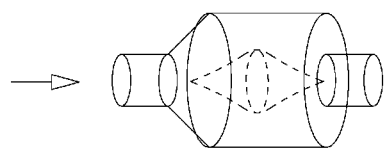
Figure 6A:
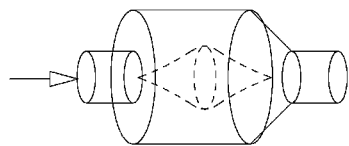
Figure 6A:
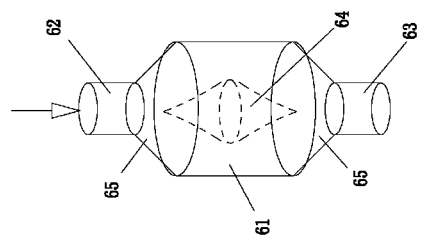

As shown in FIGS. 6A~6E, in the embodiment, the self-oscillating chamber 61 is connected to the circular tube 62 of the gas inlet and the circular pipeline 63 of the gas outlet through a connection part in a shape of truncated cone 65; the connection part 65 in a shape of the truncated cone and the upper and lower ends of the self-oscillating chamber forms a convex or concave setting. As shown in FIG. 6A, the connection part 65 in a shape of the truncated cone is provided both between the self-oscillating chamber 61 and the circular pipeline of the gas inlet 62 and between the self-oscillating chamber 61 and the circular pipeline of the gas outlet 63. As shown in FIGS. 6C and 6D, the connection part 65 in a shape of the truncated cone is provided between the self-oscillating chamber 61 and the circular pipeline of the gas inlet 62, wherein in FIG. 6C, the connection part 65 in a shape of the truncated cone forms a convex setting, and in FIG. 6D, the connection part 65 in a shape of the truncated cone forms a concave setting; and as shown in FIGS. 6B and 6E, the connection part 65 in a shape of the truncated cone is provided between the self-oscillating chamber 61 and the circular pipeline of the gas outlet 63, wherein in FIG. 6B, the connection part 65 in a shape of the truncated cone forms a convex setting, and in FIG. 6E, the connection part 65 in a shape of the truncated cone forms a concave setting.

When compared with the prior art, the present invention can obtain the following beneficial effects:

(1) Prominently Increase in Back-Flushing and Regeneration Efficiency

The pressure oscillating is generated in the filtration pipeline in a plurality of times during the pulse back-flushing, which equals to that deashing is performed in a plurality of times for only one time of back-flushing, thus the regeneration efficiency is prominently increased.

(2) Improving the Non-Uniformity of Back-Flushing

A plurality of oscillating waves are generated and transmitted in the filtration pipeline, so the energy loss from the opening end of the filtration pipeline to the closed end is reduced, thereby improving the non-uniformity of back-flushing on different parts of the filtration pipeline in the prior art, and reducing the dust bridging among filtration pipelines.

(3) Reducing the Consumption of the Amount of Back-Flushing Flow, Thereby Reducing the Thermal Impact on the Filtration Pipeline The relatively low back-flushing pressure is used to achieve the better deashing effect, and the amount of the consumed flow is saved; and the relatively low back-flushing pressure has relatively low thermal impact on the filtration pipeline, so the problems such as fracture caused by the thermal fatigue is reduced, thereby prolonging the service life of the filtration pipeline.

(4) In Particular Applicable for Rigid Filtration Elements and Flexible in Utilization The applicable conditions and characteristics of the pulse-jet cleaning device according to the present invention: the pulse back-flushing fluid is momentary (the back-flushing lasts for a very short time, e.g. only 300-500 ms) and unstably compressible high pressure gas; it is suitable for rigid filtration elements (such as a ceramic filter tube or a sintered metal filtration pipeline); for the present invention, the best self-oscillating frequency of the back-flushing gas can be adjusted according to the practical operating conditions and different filtration elements, so as to achieve the best utilization effect and flexible utilization.

For better explanation of the effect of the present invention and increasing the reliability and feasibility, partial experimental data hereby is disclosed as follows:

Through the experiment, the pressure waveform in the filtration pipeline and the pulse cleaning and regeneration efficiency are achieved by using the pulse-jet cleaning device according to the present invention and that in the prior art, a comparison thereof is made.

The experiment is conducted in a practical high-temperature gas filtration device of a factory, the pressure waveform in a certain filtration pipeline of the filter being tested under the same experimental conditions with the pulse back-flushing pressure and the temperature being 8.2 MPa and 225° C. respectively.

Figure 7:
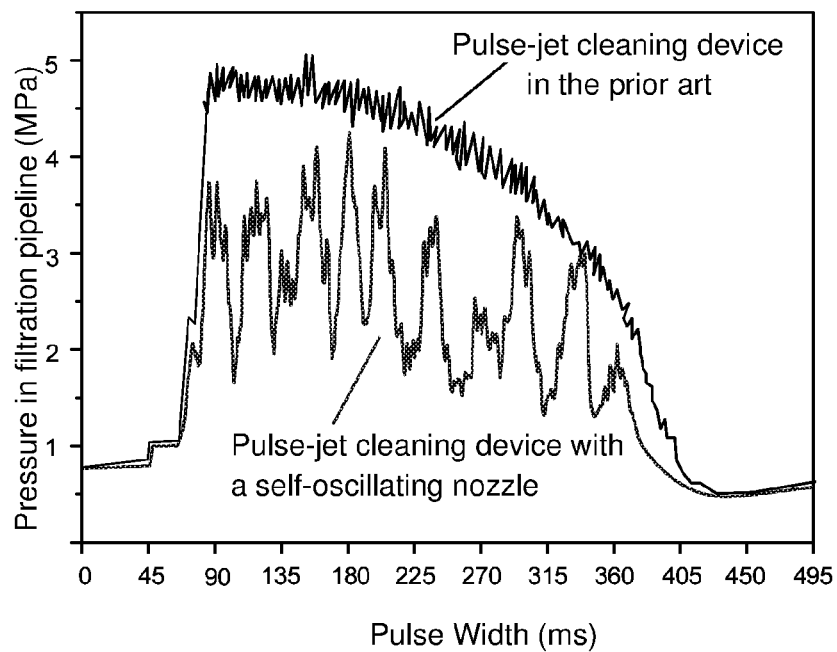
FIG. 7 shows the comparison of the pressure waves in the filtration pipeline between the present invention and the prior art when performing the back-flushing.
Figure 8:
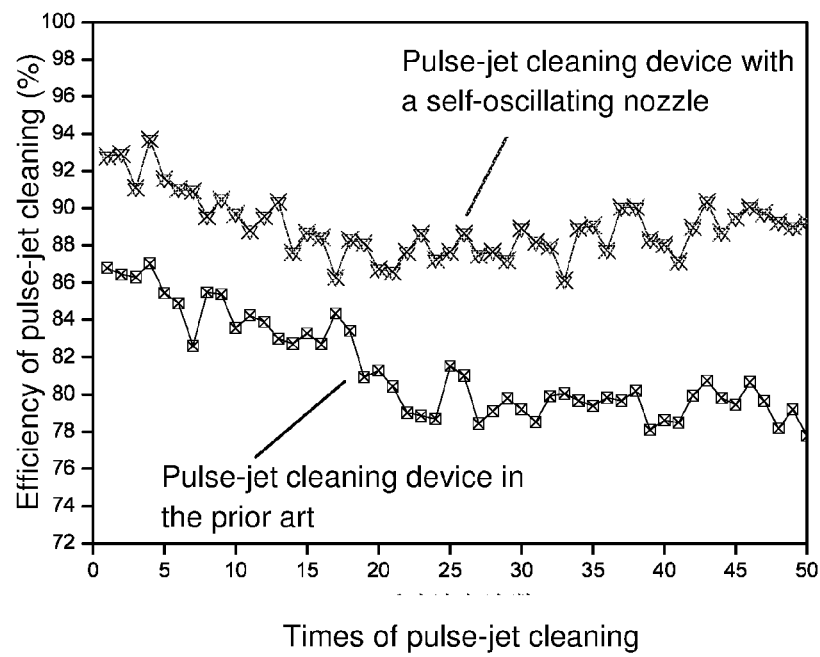
FIG. 8 shows the comparison of the pulse cleaning and regeneration efficiency between the present invention and the prior art.

As shown in FIGS. 7 and 8, FIG. 7 is the comparison of the pressure waves in the filtration pipeline between the present invention and the prior art; and FIG. 8 is the comparison of the pulse cleaning and regeneration efficiency between the present invention and the prior art.

From FIG. 7, it can be seen that during the back-flushing of the pulse-jet cleaning device in the prior art, the pressure waveform in the filtration pipeline increases quickly and then gradually decreases after achieving a peak value, thereby realizing deashing by the momentary energy. The pressure peak value of the pulse back-flushing generated by the prior art is about 4.8 MPa tested in the present experiment. Whereas, when using the pulse-jet cleaning device with a self-oscillating nozzle, the oscillating pressure waveform appear in the filtration pipeline, to be specific, the oscillating pressure waves appear 10 times in a very short time of the pulse width 350 ms, which equals that the filtration pipeline is back flushed 10 times, although the peak pressure value is less than that of the prior art. Therefore, the deashing effect is prominently increased.

For further verifying the performance of the back-flushing device of the present invention, a test on the regeneration efficiency during the filter cycling is conducted. As the result shown in FIG. 8, during the operation of the filter, the regeneration efficiency is prominently lower by using the back-flushing device in the prior dashing art than that by using the back-flushing device of the present invention, and the regeneration efficiency of the pulse-jet cleaning device for filter with a self-oscillating nozzle is prominently improved.

The above are only the illustrative embodiments of the present invention, and are not used for limiting the scope of the present invention. Any equal change or amendment made by a person skilled in the field without departing from the spirits and principles of the present invention belongs to the protection scope of the present invention.

The invention claimed is:

1. A pulse-jet cleaning device for a filter with a self-oscillating nozzle, wherein a tube sheet of the filter is provided with a filtration unit which consists of at least one filtration element, the tube sheet hermetically divides the filter into a cleaning gas chamber in an upper portion and a dust-containing gas chamber in a lower portion, and the pulse-jet cleaning device comprises an ejector provided on an upper portion of the filtration unit and a back-flushing pipeline corresponding to the ejector, with one end of the back-flushing pipeline connected to a back-flushing gas tank through a pulse back-flushing valve, wherein the other end of the back-flushing pipeline is provided with the self-oscillating nozzle corresponding to a top portion of the ejector, and the self-oscillating nozzle comprises a hollow cylindrical self-oscillating chamber, which has a gas inlet at an upper end connected to the back-flushing pipeline and a gas outlet at a lower end, wherein an oscillating frequency regulating part, with a shuttle shape of two pointed ends and a middle portion wider than the two pointed ends, and with an external transition surface, is suspended in the axial direction in the self-oscillating chamber corresponding to the gas inlet and gas outlet, wherein the gas inlet and the gas outlet are provided in a central axial direction of the self-oscillating chamber and formed as circular pipelines with a diameter less than that of a central portion of the self-oscillating chamber, with the inner diameter of the gas outlet being gradually tapered, and the oscillating frequency regulating part is suspended at the center of the circular pipeline of the gas inlet with a position regulating lever being connected to an upper end of the oscillating frequency regulating part in the axial direction.

2. The pulse-jet cleaning device for a filter with a self-oscillating nozzle according to claim 1, wherein a suspension bracket is provided inside the circular pipeline of the gas inlet, and an upper portion of the position regulating lever is fixed at the center of the suspension bracket.

3. The pulse-jet cleaning device for a filter with a self-oscillating nozzle according to claim 1, wherein the central portion of self-oscillating chamber is connected to the circular pipeline of the gas inlet and/or the circular pipeline of the gas outlet through a connection part in a shape of a truncated cone, and a convex or concave setting is formed by the connection part in the shape of a truncated cone.

4. The pulse-jet cleaning device for a filter with a self-oscillating nozzle according to claim 1, wherein the tube sheet of the filter is provided with a plurality of groups of filtration units, each group of filtration units is provided with a plurality of filtration elements, wherein the self-oscillating nozzle is provided above the ejector of each group of filtration units respectively.

5. The pulse-jet cleaning device for a filter with a self-oscillating nozzle according to claim 1, wherein the filtration element is a sintered metal filtration pipeline or a ceramic filter tube.

* * * * *